United States Patent [19]

Lyden

[11] 4,096,924
[45] Jun. 27, 1978

[54] OILER ASSEMBLY

[75] Inventor: Frank J. Lyden, Manitowoc, Wis.

[73] Assignee: Oil-Rite Corporation, Manitowoc, Wis.

[21] Appl. No.: 784,422

[22] Filed: Apr. 4, 1977

Related U.S. Application Data

[62] Division of Ser. No. 595,118, Jul. 11, 1975, Pat. No. 4,062,424.

[51] Int. Cl.² ............................................. F16N 17/06
[52] U.S. Cl. ........................................ 184/58; 184/81; 184/83; 184/96; 210/510
[58] Field of Search ................... 184/58, 59, 55 R, 65, 184/81, 87, 96, 83, 85, 7 CR, 7 E; 210/510, 446

[56] References Cited

U.S. PATENT DOCUMENTS

| | | | |
|---|---|---|---|
| 227,570 | 5/1880 | Paulson et al. | 184/87 X |
| 306,542 | 10/1884 | Smith | 184/87 |
| 992,229 | 5/1911 | Mille | 184/85 |
| 1,442,826 | 1/1923 | Renstrom | 184/96 X |
| 1,687,780 | 10/1928 | Neale | 184/87 X |
| 2,583,457 | 1/1952 | Woodall | 184/102 |
| 2,788,128 | 4/1957 | Heine | 210/510 UX |
| 2,789,654 | 4/1957 | Zurit | 210/446 X |
| 3,042,079 | 7/1962 | Swift et al. | 210/510 X |
| 3,317,003 | 5/1967 | Lukas | 184/81 |

Primary Examiner—David H. Brown
Attorney, Agent, or Firm—Andrus, Sceales, Starke & Sawall

[57] ABSTRACT

An oiler assembly is disclosed for feeding a relatively precise and consistent lubrication. The assembly includes a supply of the lubricant and a flow line placing the supply in communication with the lubrication point. A metering valve is interposed in the flow line and generally comprises a body having an inlet and an outlet. The body further includes a bore having one end thereof in communication with the inlet and the other end thereof in communication with the outlet. A porous rod is disposed in the bore of the body. A sealing member is disposed in the bore to preclude the passage of lubricant from the inlet end to the outlet end of the bore except by passage through said porous rod.

9 Claims, 7 Drawing Figures

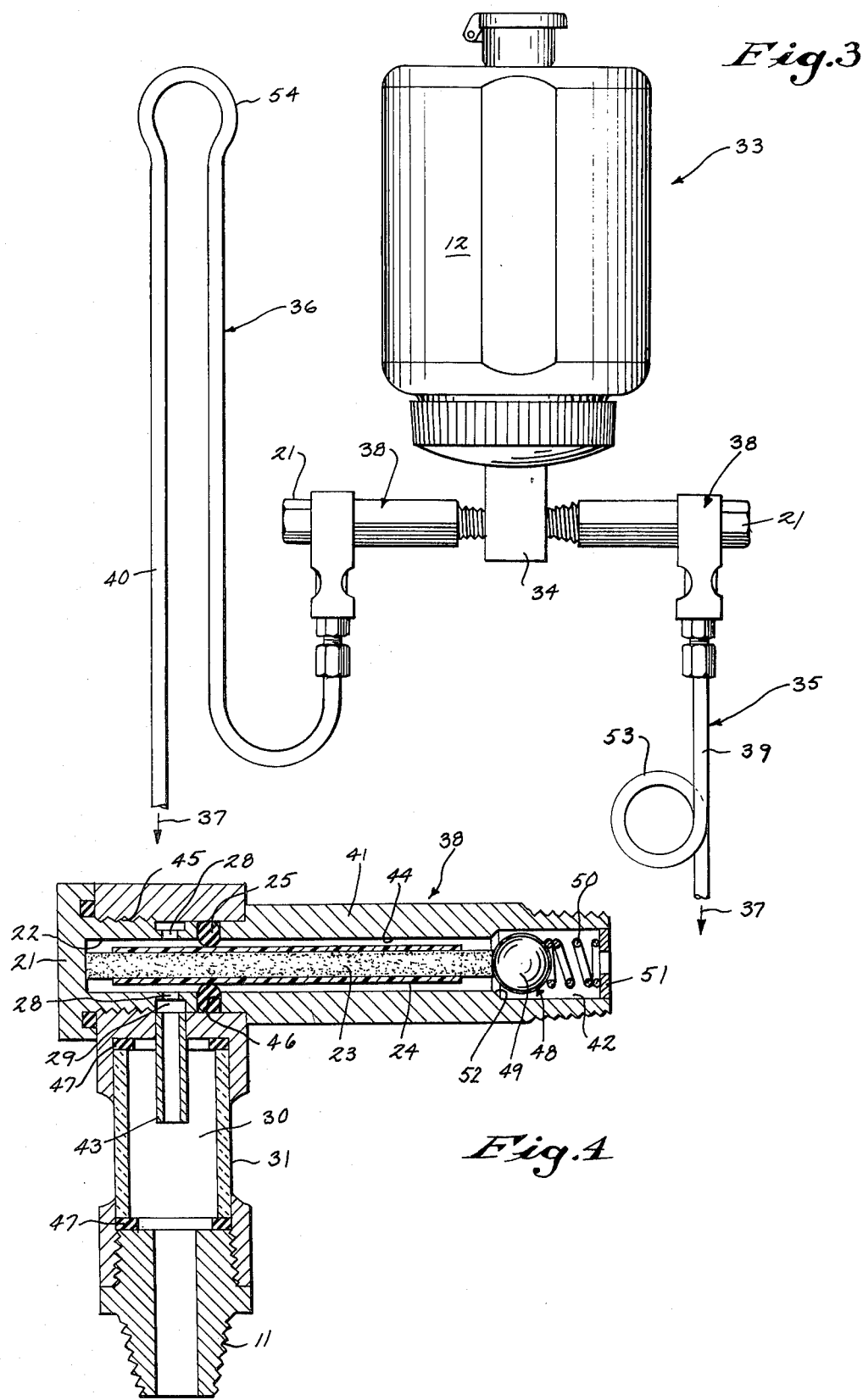

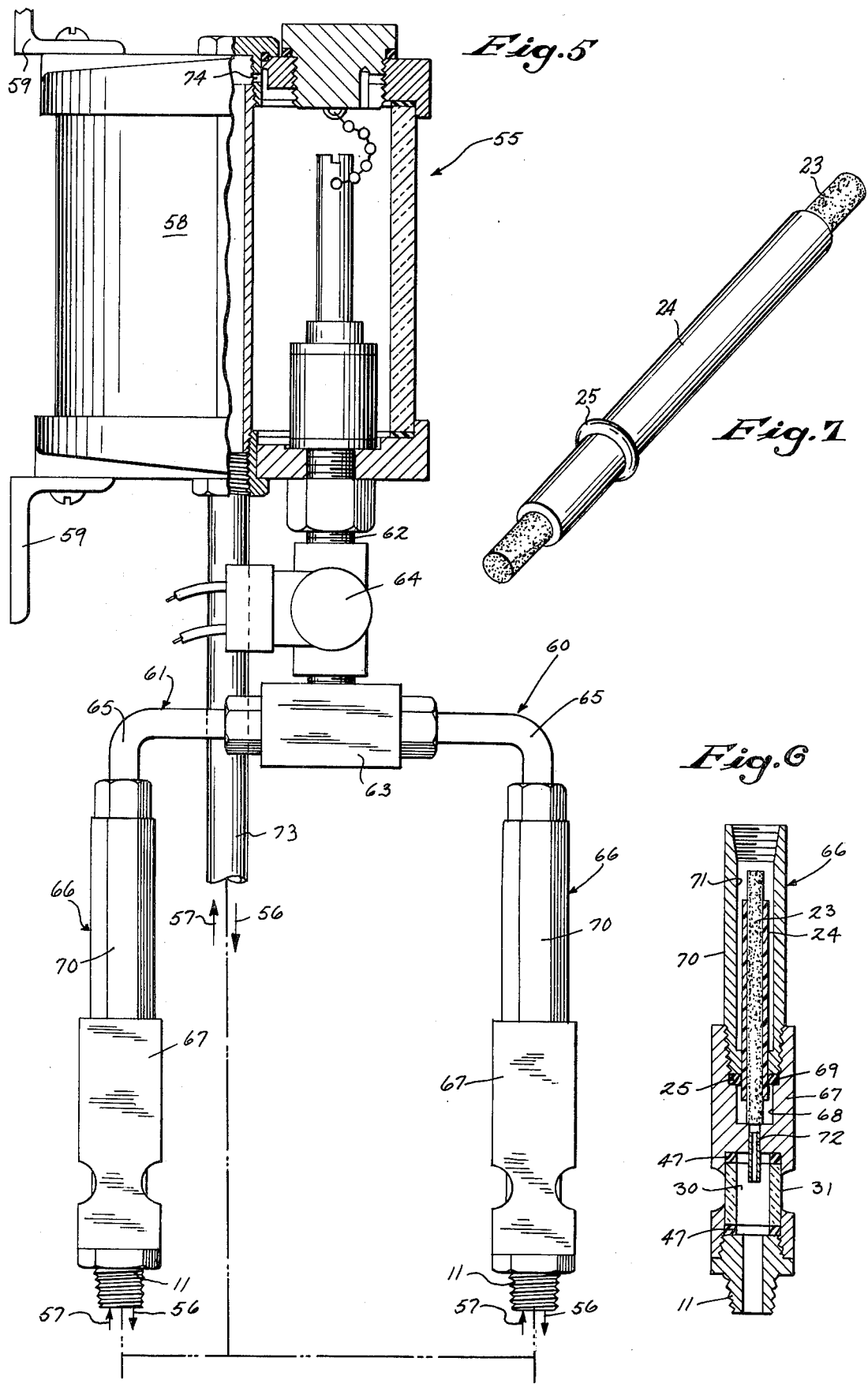

OILER ASSEMBLY

This is a division of application Ser. No. 595,118, filed July 11, 1975, now U.S. Pat. No. 4,062,424.

BACKGROUND OF THE INVENTION

This invention relates to an oiler assembly for the drop feeding of a liquid lubricant such as oils and soap compounds.

Needle valves are commonly employed in the drop feeding of liquid lubricants. For relatively fast feed rates, such valves are generally quite adequate. At relatively slow feed rates, needle valves are generally not consistent due to silting and must usually be adjusted and/or replaced at relatively short intervals. In view of their extra small diameter, needle valves employed for extra-fine metering of liquid lubricant, and particularly where additives are present in the lubricant, are the most troublesome and erratic. It is generally an object of this invention to provide an oiler assembly capable of drop feeding a liquid lubricant with substantial consistency even at relatively minute feed rates, even as low as one drop in five minutes and even less.

SUMMARY OF THE INVENTION

The invention contemplates an oiler assembly inclusive of a supply of the liquid lubricant and a flow line placing the supply in communication with the point of lubrication. A metering valve is interposed in the flow line and generally comprises body means having an inlet for receiving the lubricant from the supply and an outlet for delivery of the lubricant. The body means further includes a bore intermediate the inlet and the outlet. A porous rod is disposed in the bore of the body means. And means are further disposed in the bore to provide for the passage of the liquid lubricant solely through the porous rod.

DESCRIPTION OF THE DRAWING FIGURES

The drawings furnished herewith illustrate the best mode presently contemplated for the invention and are described hereinafter.

In the drawings:

FIG. 3 is a side elevation of an oiler assembly and wherein the lubrication points impose or draw a vacuum;

FIG. 4 is an enlarged sectional view of the metering valve and feed sight depicted in the oiler assembly of FIG. 3;

FIG. 5 is a side elevation with parts broken away and sectioned of an oiler assembly wherein the lubrication points impose pressure or vacuum;

FIG. 6 is a sectional view of the metering valve and feed sight depicted in the oiler assembly of FIG. 5; and FIG. 7 is an enlarged perspective view of the porous rod with impervious sleeve as employed in the metering valves as detailed in FIGS. 2, 4 and 6.

DESCRIPTION OF THE ILLUSTRATED EMBODIMENTS

Figure 1:
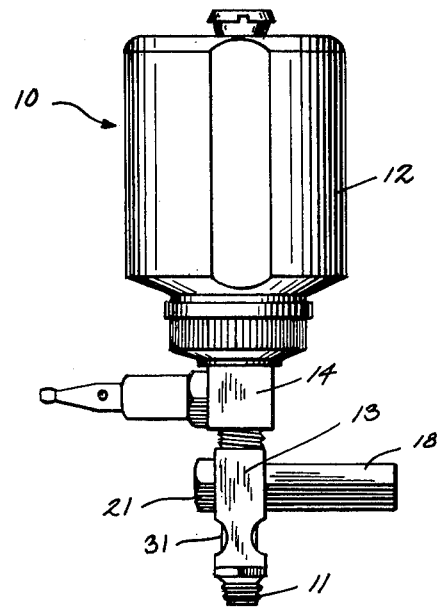
FIG. 1 is a side elevation of an oiler assembly embodying the invention.

Referring to the drawings, the oiler assembly 10 of FIG. 1 carries a hollow threaded mounting shank 11 at the lower end thereof for threaded engagement at a lubrication point, not shown. The oiler assembly 10 is adapted to drop feed a generally precise amount of oil lubricant on the point of lubrication.

The oiler assembly 10 includes a vented reservoir 12 which contains a supply of the oil lubricant. During periods of operation, the lubricant in the reservoir 12 is fed by gravity and flows through the metering valve 13. A mechanical toggle shut-off valve 14 is interposed between the reservoir 12 and the metering valve 13 to provide for on-off flow control of the oiler assembly 10.

Figure 2:
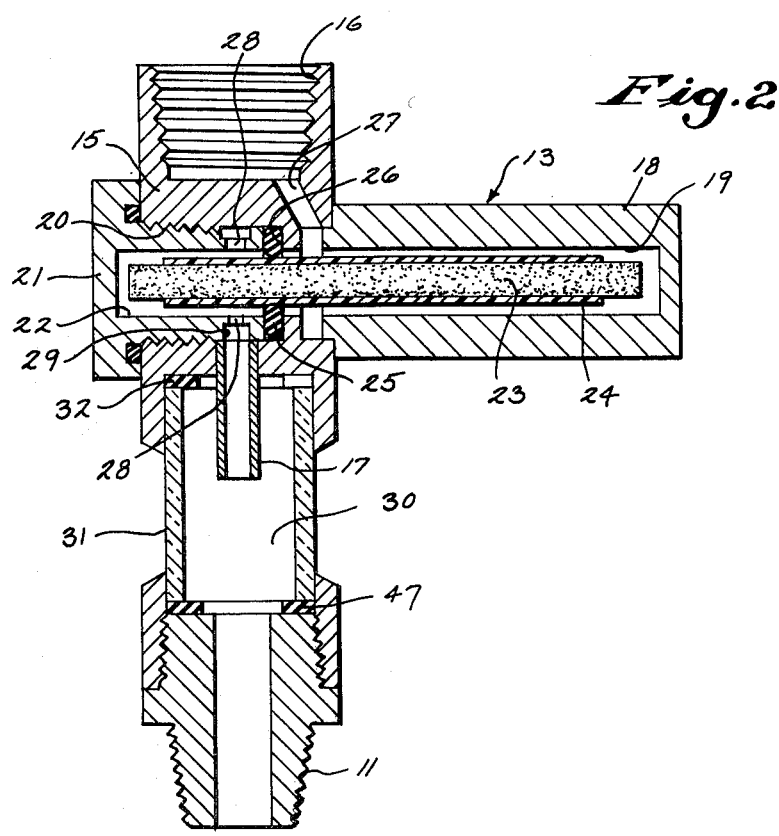
FIG. 2 is an enlarged sectional view of the metering valve and feed sight depicted on the oiler assembly of FIG. 1.

As more clearly shown in FIG. 2, the metering valve 13 represents a straight configuration or orientation wherein the valve body 15 is provided with an inlet 16 that is generally vertically or axially spaced and aligned with the outlet nozzle 17. Intermediate the inlet 16 and the outlet nozzle 17, the body 15 includes horizontal tubular projection 18 having a stepped bore 19 axially thereof with a closed remote end. The inlet 20 to the bore 19 is threaded and opens from the body 15 and is adapted to receive the hollow threaded closure member 21. In assembled relation, the bore 22 in the closure member 21 is aligned with the smaller diameter portion of projection bore 19 and generally constitutes an extension thereof.

Metered flow through the valve 13 is controlled by the porous rod 23 disposed in the aligned bores 19 and 22. The rod 23 is provided with an impervious outer coat or sleeve 24 over a portion of its length intermediate the ends thereof. The rod 23 is supported in spaced relation from the walls of bores 19 and 22 by an O-ring seal 25 sandwiched between the inner end of the closure member 21 and the opposed shoulder 26 of the stepped bore 19. The seal 25 is effective to preclude flow communication on the outside of the rod 23 between the bores 19 and 22 and thus forces the oil lubricant to pass through the rod. The rod 23 is shown enlarged in FIG. 7.

In the valve 13, the inlet 16 communicates with the bore 19 through the passage 27 of the valve body 15. The oil lubricant then passes through the rod 23 into the bore 22. From the bore 22, the oil lubricant flows through one or more of a plurality of circumferentially spaced holes 28 connecting the bore 22 and the annular groove passage 29 formed on the outer periphery of the closure member 21. In assembled relation with the valve, the annular passage 29 of the closure member 21 is placed in communication with the outlet nozzle 17.

A sight chamber 30 is incorporated with the valve 13 and surrounds the opening from the outlet nozzle 17. The drop feeding performance of the oiler assembly 10 can be viewed and checked through the tubular sight member 31 secured in place by the threaded mounting shank 11.

The split ring gasket 32 at the upper end of the sight member 31 exposes the sight chamber 30 to atmospheric pressure to provide for an equalization of pressure on opposite ends of the porous rod 23 and gravity flow through the valve 13 during periods of operation. The equality of pressure on opposite ends of the rod 23 is disturbed upon manual closure of valve 14 to provide for generally effective flow shut-off from the oiler assembly 10.

The porous rods 23 are generally of sintered construction having a selected density and may be fabricated of metal, plastic or glass. The density of the rods 23 is selected in accordance with the feed rate needed or desired at a particular point of lubrication. The feed rate is also dependent on the length of the coat or sleeve 24 which establishes the length of the path of the oil lubricant through the pores or interstices of the rod 23. The length of the path of oil travel can vary from a minimum condition of no coat or sleeve 24, when the oil need simply enter the rod 23 to pass the O-ring seal 25, to a maximum condition where the coat or sleeve covers the entire tubular surface of the rod.

For applications where the length of path of oil travel is rather accurately determined, the coat or sleeve 24 may comprise a painted on cover to close up the pore openings at the tubular surface of the rod 23 to the desired length. Alternatively, the coat or sleeve 24 may comprise a plastic tubing which is heat shrunk into position on the rod 23. The plastic tubing coat or sleeve 24 offers the advantage of being peelable from the rod 23, in its entirety if necessary but more often in part, to alter the length of oil travel and thereby provide for adjustment of the feed rate.

In the metering valve 13 of FIG. 2, the porous rod 23 is readily removable for purposes of making feed rate adjustment or to replace a rod of given density by another of greater or less density. The rod 23 is made easily accessible by removal of the threaded closure member 21 and does not require a disassembly of the valve 13 from the flow line.

The oiler assembly 33 of FIG. 3 includes a vented reservoir 12 supported on a hollow mounting block 34. The reservoir 12 of FIG. 3 is shown to supply a pair of flow lines 35 and 36 which are connected at points of lubrication, not shown, that draw a vacuum as represented by the arrows 37.

The flow line 35 as viewed on the right in FIG. 3 includes a metering valve 38 the inlet end of which is connected into the block 34. Tubing 39 is coupled to the outlet end of the metering valve 38 and extends to the lubrication point.

The flow line 36 as viewed on the left in FIG. 3 also includes a metering valve 38 having an inlet end connected into the mounting block 34. Tubing 40 is coupled to the outlet end of the left metering valve 38 and extends to its point of lubrication.

The metering valve 38 is of angle configuration or orientation with the body 41 providing for an inlet 42 that is normal to the outlet nozzle 43. The body 41 of valve 38 is provided with a generally horizontal stepped through bore 44 which terminates with the inlet 42 at the remote end thereof. Opposite from the inlet end the bore 44 is provided with an enlarged and threaded opening 45 for receiving a closure member 21.

A porous rod 23 having a coat or sleeve 24 is disposed in the aligned bores 44 and 22 in the body 41 and closure member 21, respectively, and is supported generally centrally of the aligned bores by the O-ring seal 25 sandwiched between the closure member and the opposed shoulder 46 of the stepped bore. The smaller diameter portion of bore 44 is effectively sealed from the aligned bore 22 by the O-ring 25 so that oil lubricant in the bore 44 must pass through the rod 23 to reach the bore 22 in the closure member 21.

Similarly as described in connection with metering valve 13 of FIGS. 1 and 2, the oil lubricant from closure member bore 22 passes through one or more circumferentially spaced holes 28 into the annular groove passage 29 of the closure member 21 to reach the outlet nozzle 43. The outlet nozzle 43 also opens into a sight chamber 30 so that the performance of the oiler assembly 33 can be visually checked. In the case of the oiler arrangement of FIG. 3 wherein a vacuum is drawn at the lubrication point, the sight chamber 30 is sealed by full ring gaskets 47 at both ends of the sight member 31.

To guard against a possible inadvertent omission of the rod 23 in the angle metering valve 38, a check valve 48 is provided at the inlet 42 of the valve. A check ball 49 is disposed in the enlarged inlet portion of through bore 44 and is biased toward the rod 23 by the coil spring 50 seated against the stop washer 51 at the inlet. Under normal circumstance, the check valve 48 is maintained open to provide for the flow of oil lubricant into the bore 44 by the rod 23. In the event the rod 23 is inadvertently omitted, the check ball 49 will be biased against the angular shoulder 52 of stepped bore 44 by the spring 50 to close the bore 44 and preclude the flow of oil and possible flooding at the lubrication point.

As earlier indicated, the arrow 37 indicates an imposed vacuum in the tubing 39 of flow line 35. If a porous rod 23 of selected density delivers one drop of a given oil lubricant at an interval of about ten seconds under eight inches of mercury vacuum, a shutoff in the flow line 35 is probably unnecessary as the delivery from the metering valve 38 may be considered negligible after the source of vacuum is removed. If desired, however, a shutoff may be interposed in the flow line 35 and may even be necessary if faster flow conditions require a rod 23 of lesser density.

The tubing 39 of flow line 35 includes a loop 53 which in operation is partially filled with oil. The loop 53 will trap any afterdrip and any negligible flow after the vacuum source is removed or shut down. The small added accumulation of oil in the loop 53 during downtime is advantageous since it will be immediately available at start up when the vacuum condition is reimposed. If the point of lubrication for the flow line 35 causes a nonsteady or pulsating vacuum, such as on a vacuum pump, the oil in the loop 53 will dampen the pulsations and so prevent erratic drop performance from the metering valve 38.

The tubing 40 of the flow line 36 includes a reverse bend loop 54 which is also partially filled with oil during periods of operation. The oil in the reverse bend loop 54 will also dampen the pulsations that otherwise might affect the drop performance of the metering valve 38. Since the height of the loop 54 exceeds the maximum fill level of the reservoir 12 in FIG. 3, the loop will further serve as an automatic shutoff when the source of vacuum is removed or shut down.

The oiler assembly 55 of FIG. 5 is intended for use on lubrication points, not shown, that impose either a vacuum condition, as represented by the arrows 56, or a pressure condition, as represented by the arrows 57.

Oiler assembly 55 includes a closed or nonvented reservoir 58 adapted for mounting support by the brackets 59. The reservoir 58 supplies the branch flow lines 60 and 61 through the main supply line 62 connected to the underside of the reservoir. The flow lines 60 and 61 are coupled on opposite ends of a suitable hollow coupling member 63 which is in turn coupled to the supply line 62. A solenoid shutoff valve 64 is interposed in the supply line 62.

The branch lines 60 and 61 are generally identical having tubing 65 interposed between the coupling member 63 and a metering valve 66. The line extensions from the valves 66 to the lubrication points are not shown.

The metering valves 66 are shown in section in FIG. 6 and are of a straight configuration or orientation with the porous rod 23 disposed vertically. The valves 66 comprise a body 67 having a vertically extending stepped through bore 68. The largest portion of bore 68 opens upwardly from the shoulder 69 and is adapted to threadedly receive the tubular body extension member 70. The porous rod 23 with impervious coat or sleeve 24 is disposed in the through bore 71 of the body extension member 70 and extends past the lower end of the extension member into the bore 68 of the main body 67. The O-ring seal 25 is sandwiched between the end of the extension member 70 and the opposed shoulder 69 and precludes passage of oil lubricant from the bore 71 into the bore 68 on the outside of the coat or sleeve 24. The oil lubricant is thus afforded passage only through the porous rod 23 from the bore 71 into the bore 68. A nozzle outlet 72 is press fit in the lower smallest portion of bore 68 to receive the oil that has passed through the rod 23 and extends downwardly into the sealed sight chamber 30 incorporated into the valve 66.

The reservoir 58 of the oiler assembly 55 includes a vent or pressure equalization tube 73 which extends upwardly through the bottom of the reservoir all the way to its top where a vent passage 74 from the tube 73 communicates with the interior of the reservoir above the maximum fill level of the oil lubricant. When the branch lines 60 and 61 connect to lubrication points that impose a vacuum condition, such as a vacuum pump, the vent tube 73 is similarly connected to that source of vacuum as by the tubing arrangement generally illustrated by dot-dash lines in FIG. 5. When a vacuum condition prevails in the entire oiler assembly 55 as represented by the arrows 56, the assembly functions like a gravity feed system. Similarly, when a pressure condition prevails in the entire oiler assembly, as represented by the arrows 57 and as might occur when the assembly is connected to a compressor unit, the assembly will also function like a gravity feed system. The shutoff valve 64 is necessary in the assembly 55 because when either vacuum or pressure are removed or shut down, feeding of lubricant by gravity would ordinarily continue as the entire assembly becomes equalized at atmospheric pressure.

The invention thus provides an oiler assembly which can relatively precisely drop feed a liquid lubricant with substantial consistency over a relatively long period. Feed rates for lubricants even as low as one drop in five minutes and even less are possible.

Various modes of carrying out the invention are contemplated as being within the scope of the following claims particularly pointing out and distinctly claiming the subject matter which is regarded as the invention.

I claim:

1. In an oiler assembly for delivering a liquid lubricant to a point of lubrication, a vented reservoir containing the lubricant, a supply line extending from the bottom of the reservoir, a body having an inlet communicating with the supply line and an outlet, said body further having a bore with one end thereof communicating with the inlet and the other end thereof communicating with the outlet, a porous rod of sintered construction disposed in said bore between said inlet and said outlet and in spaced relation from the wall thereof, seal means disposed in said bore between the porous rod and the wall of the bore to preclude passage of lubricant from the inlet end to the outlet end of the bore except by passage through said porous rod, tubing placing the outlet of the body in communication with the lubrication point, and a source imposing a vacuum at the lubrication point, said porous rod being of selected density to provide for the desired feed rate of lubricant in response to the vacuum condition of the lubrication point.

2. The structure as set forth in claim 1 wherein the density of the porous rod provides for the desired feed rate of lubricant in response to the vacuum condition at the lubrication point and substantially precludes the flow of lubricant upon removal of the vacuum condition.

3. The structure as set forth in claim 1 wherein the tubing connecting the outlet from the body to the lubrication point includes a reverse bend loop which extends upwardly to the height of the reservoir and serves to shut off the flow of lubricant to the lubrication point upon removal of the vacuum condition.

4. The structure as set forth in claim 1 wherein the vacuum source gives rise to pulsations and the tubing connecting the outlet from the body to the lubrication point includes loop means which are at least partially filled with lubricant to dampen the pulsations and thereby prevent an otherwise erratic feed rate performance through the porous rod.

5. In an oiler assembly for delivering a liquid lubricant to a point of lubrication, a reservoir containing the lubricant and having a vent, a supply line extending from the bottom of the reservoir, a body having an inlet communicating with the supply line and an outlet, said body further having a bore with one end thereof communicating with the inlet and the other end thereof communicating with the outlet, a porous rod disposed in said bore, seal means disposed in said bore to preclude passage of lubricant from the inlet end to the outlet end of the bore except by passage through said porous rod, tubing placing the outlet of the body in communication with the lubrication point, a source imposing a vacuum at the lubrication point, tubing means connecting the vacuum source to the reservoir vent to equalize the pressure at opposite ends of the porous rod and so provide for gravity feed operation for the oiler assembly, and shut off valve means in the supply line to substantially prevent delivery of lubricant upon removal of the vacuum condition, said porous rod being of selected density to provide for the desired feed rate of lubricant in response to the vacuum condition of the lubrication point.

6. A valve for metering a liquid lubricant, comprising a body provided with an inlet and an outlet, said body further having a bore with one end thereof communicating with the outlet, a porous rod of selected density disposed in said bore, said inlet and outlet openings being disposed generally normal to each other and the bore containing the porous rod being generally aligned with one of said openings, an impervious sleeve provided on said rod and extending over at least a portion of the length of the rod, and sealing means disposed between the sleeve on said rod and the wall of the bore to preclude the passage of lubricant from the inlet end of the bore to the outlet end of the bore except by passage through said porous rod.

7. A valve for metering a liquid lubricant, comprising a body provided with an inlet and an outlet, said body further having a bore with one end thereof communicating with the outlet, a porous rod of selected density disposed in said bore, said inlet and outlet being disposed generally normal to each other and the bore containing the porous rod being generally aligned with the inlet, an impervious sleeve provided on said rod and extending over at least a portion of the length of the rod, and sealing means disposed between the sleeve on said rod and the wall of the bore to preclude the passage of lubricant from the inlet end of the bore to the outlet end of the bore except by passage through said porous rod.

8. The structure as set forth in claim 7 wherein the body is provided with an opening in communication with the bore oppositely from the inlet to provide for removal and/or replacement of the porous rod, and closure means for said opening.

9. The structure as set forth in claim 7 wherein check valve means are disposed in the inlet and serves to disrupt communication between the inlet and the bore upon removal of the porous rod.

* * * * *